Jan. 26, 1954 V. O. HAUSWIRTH 2,667,027
REEL ADJUSTMENT FOR SIDE DELIVERY RAKES
Filed Jan. 11, 1952 2 Sheets-Sheet 1
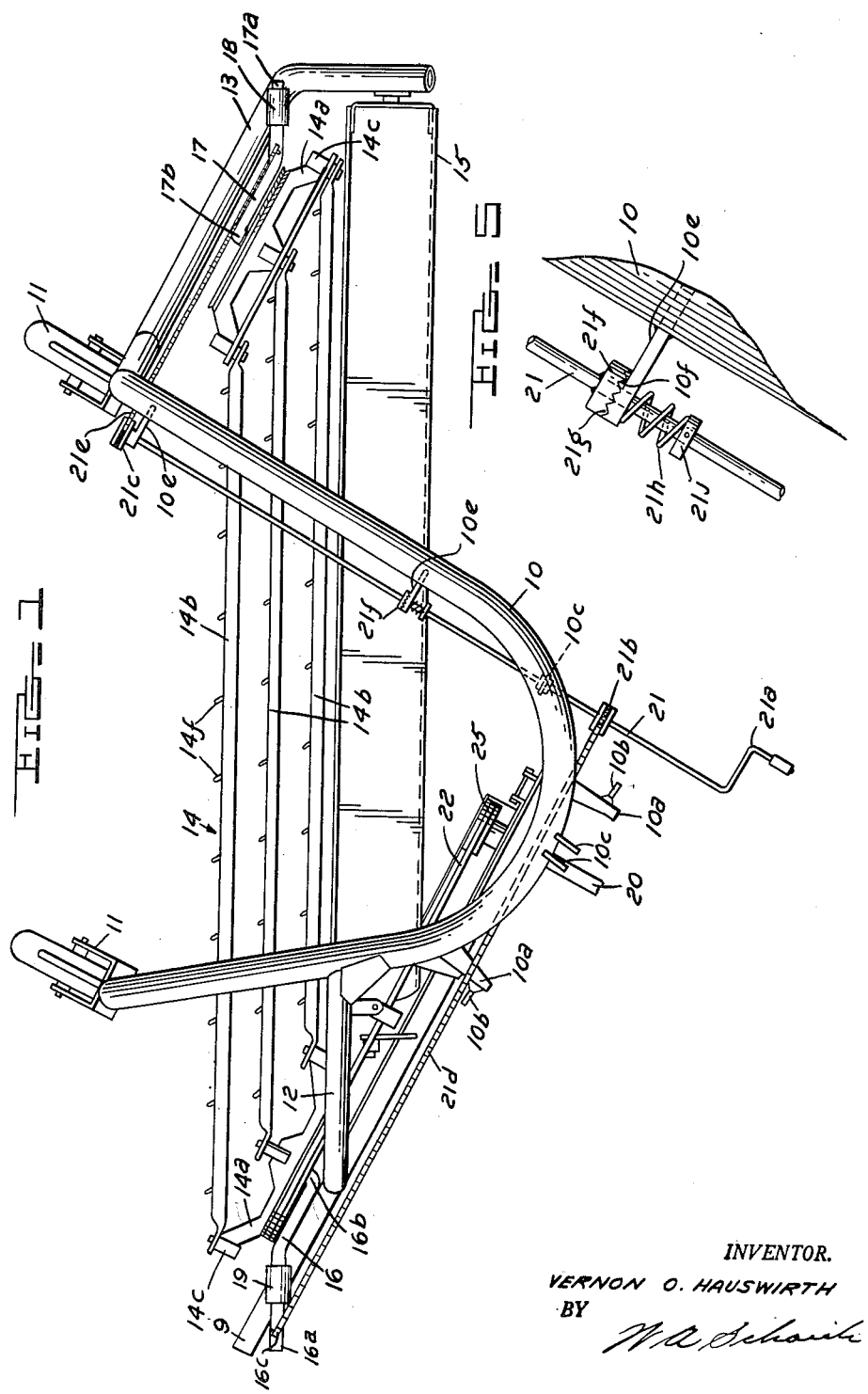
INVENTOR.
VERNON O. HAUSWIRTH
BY Jan. 26, 1954 V. O. HAUSWIRTH 2,667,027
REEL ADJUSTMENT FOR SIDE DELIVERY RAKES
Filed Jan. 11, 1952 2 Sheets-Sheet 2
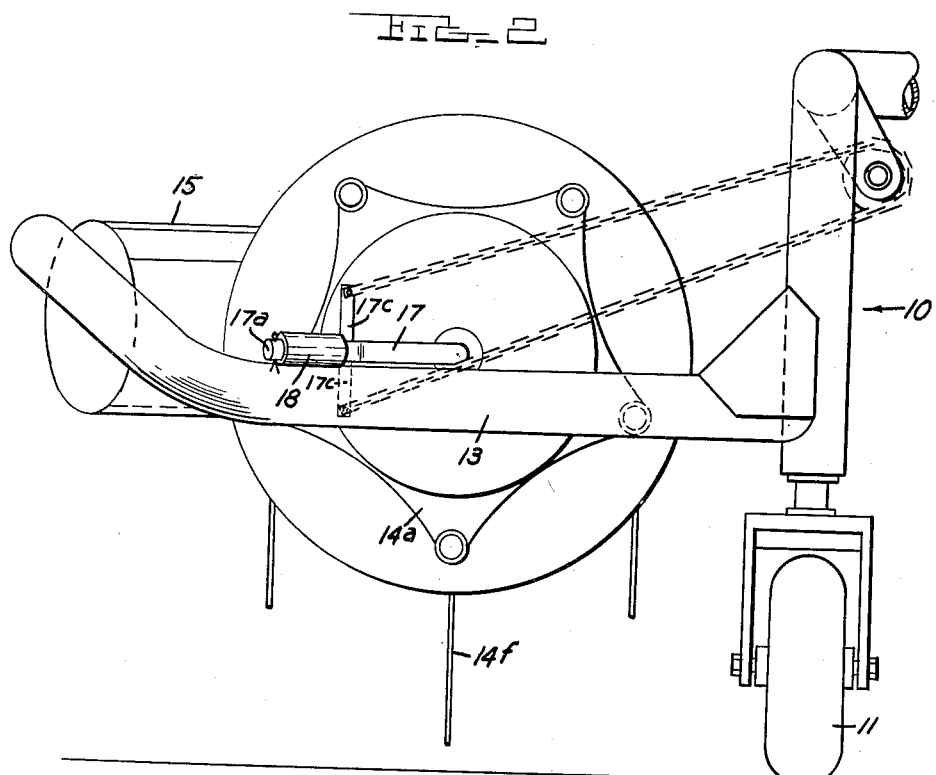
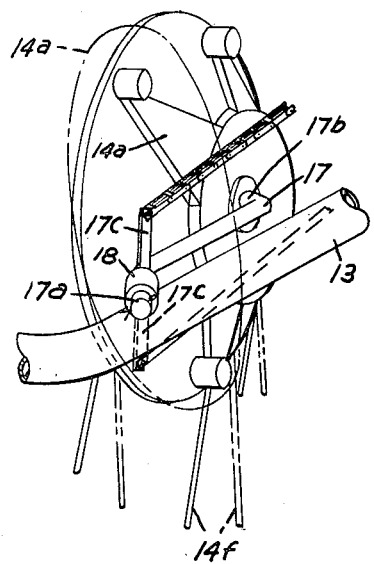
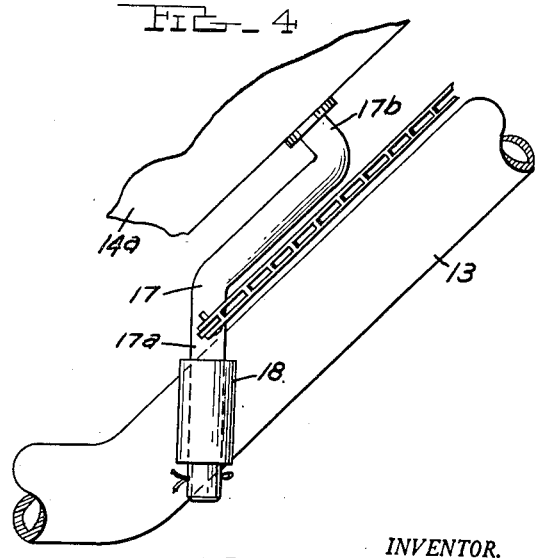
INVENTOR.
VERNON O. HAUSWIRTH
BY Patented Jan. 26, 1954

2,667,027

UNITED STATES PATENT OFFICE 2,667,027

REEL ADJUSTMENT FOR SIDE DELIVERY RAKES

Vernon O. Hauswirth, Royal Oak, Mich., assignor to Dearborn Motors Corporation, Birmingham, Mich., a corporation of Delaware Application January 11, 1952, Serial No. 266,014

3 Claims. (Cl. 56—377)

This invention relates to side delivery rakes, and particularly to an improved mechanism for adjusting the pitch of the raking teeth of such rakes with respect to the ground.

Under certain raking conditions, it has been found desirable to provide an adjustment of the pitch or angular position of the raking teeth of the cylindroid type reel to the ground surface over which the teeth move to effect the raking action.

It is an object of this invention to provide a simple, economical and convenient mechanism for effecting such adjustment.

A particular object of this invention is to provide a rake tooth pitch adjustment for a tractor mounted type side delivery rake which may be conveniently controlled by the tractor operator without leaving the seat of the tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a plan view of a side delivery rake embodying the adjusting mechanism of this invention;

Figure 2 is an enlarged scale, partial rear elevational view of the rake of Figure 1;

Figure 3 is an enlarged scale, end view of the raking drum showing the tilt of the teeth obtainable;

Figure 4 is an enlarged scale partial plan view showing the raking drum crank axle; and Figure 5 is an enlarged scale, elevational view of the locking elements of the manual adjusting linkage.

As shown on the drawings:

While the general construction of the side delivery rake to be herein described is substantially identical to the rake shown in the above referred to co-pending Richey application, it will be understood that the principles of this invention are equally applicable to any type of side delivery rake employing the well-known cylindroid type of raking reel. For example, the side delivery rake may embody a main tubular frame element 10 of generally U-shaped configuration disposed with its bight portion forward and having caster wheels 11 suitably journaled at the ends of its arms.

As is more fully described in the above referred to co-pending Richey application, this type of rake frame is most adaptable for a tractor mounted rake, and may be conveniently connected to the well-known type of tractor having three point, power-lifted hitch linkage by the provision of forwardly projecting brackets 10a which are suitably secured to the central portions of U-shaped frame 10 and mount pivot pins 10b for respective connection to the lower links (not shown) of such conventional three-point hitch linkage. Additionally, a spaced pair of ears 10c are formed in the center of bight portion of U-shaped frame 10 for pivotal mounting of the tractor top link (not shown) thereto.

Laterally projecting arms 12 and 13 are welded to the medial portions of the arms of the U-shaped frame member 10 and these arms respectively journal the end discs 14a of a cylindroid type raking reel 14. As is well known, in this type of reel, the end discs are supported for rotation about spaced parallel axes which are inclined to the direction of travel of the rake. Between the end discs 14a, a cylindrical cage-like strut of tooth bars 14b are mounted, every other bar having its ends respectively journaled in suitable bearings 14c provided on the end discs 14a. A plurality of raking teeth 14f are then mounted on each of the tooth bars 14b in a longitudinally spaced array. Additionally, a rotary stripper element 15 may be mounted on the frame 10 in adjacent parallelism to the raking reel 14. All of the elements of the rake thus far briefly described are described in much greater detail in the above referred to co-pending Richey application.

In accordance with this invention, each of the end discs 14a is journaled on the frame arms 12 and 13 respectively by crank axles 16 and 17. As best shown in Figures 3 and 4, crank axle 17 has a main bearing portion 17a journaled in a sleeve-like bearing 18 welded to the top of arm 13. Crank axle 16 likewise has a main bearing portion 16a journaled in sleeve type bearing 19 welded to the top of an arm 9 disposed below arm 12 in depending relation thereto and parallel to arm 13. A crank portion 16b of crank axle 16 is inserted in a suitable bearing of the left hand reel end disc 14A. The crank portion 17b of crank axle 17 supports the right hand reel end disc bearing 14d. Cranks 16 and 17 are respectively provided with a pair of diametrically opposed levers 16c and 17c which are normally vertically disposed. The levers 16c and 17c are preferably secured by welding to the main bearing portions of the cranks and closely adjacent the bearing sleeves 18 and 19 for a purpose to presently appear. The axes of the bearing portions 16a and 17a of cranks 16 and 17 are aligned with the longitudinal axis of the raking drum 14 which is an important feature of this invention as will be more clearly brought out later.

Accordingly, when each of the crank axles 16 and 17 occupy the same angular position relative to the axis of their body portions 16a and 17a respectively, it is apparent that their crank portions 16b and 17b merely define stationary bearing members about which the end discs 14a of the cylindroid reel 14 may rotate. Such rotational movement of the reel 14 may be produced in any conventional manner, such as by a belt drive from a shaft 20 adapted to be secured to the tractor power-take-off and including a pulley 25 on the end of such shaft and a belt 22 which traverses a pulley groove integrally formed in the one reel end disc 14a. The belt 22 may, if desired, also provide driving power for the stripping reel 15 in the manner more fully described in the above referred to co-pending Richey application.

Referring particularly to Figure 3, when a concurrent adjustment is made in the angular position of the crank portions 16b and 17b of the crank axles 16 and 17 respectively, the raking reel 14 will be tilted in a fore or aft direction depending on the direction of rotation of the crank axles and the effect will be to shift the angular position of the rake teeth 14f with respect to the ground over which they pass. This change in angular position is indicated by the dotted line construction in Figure 3. This invention, therefore, provides a manually operable motion transmission linkage to effect concurrent changes in the angular positions of the crank axles 16 and 17. As best shown in Figure 1, such linkage may comprise an elongated shaft 21 extending generally parallel to one arm of the main frame 10 and supported thereon by a plurality of brackets 10e. At its forward end, the shaft 21 terminates in a crank portion 21a which is positioned closely adjacent the operator's seat on the tractor (not shown) to which the rake is mounted. Sprockets 21b and 21c are respectively keyed to shaft 21 in appropriate positions to be aligned with the levers 16c and 17c which are respectively secured to the crank axles 16 and 17. Chains 21d and 21e are employed to interconnect the sprockets 21b and 21c with the ends of levers 16c and 17c respectively. Hence, angular adjustment of the crank portion 21a will effect a corresponding concurrent angular adjustment of the crank axles 16 and 17.

However, it is necessary that the crank axles 16 and 17 be rigidly retained in any selected position of angular adjustment. This function is conveniently accomplished by a cylindrical locking element 21f which is keyed to shaft 21 at a position axially adjacent to one of the supporting brackets 10e. Locking element 21f has a plurality of locking teeth 21g formed on its face which is adjacent to the bracket 10e and a corresponding circular array of teeth 10f are provided on the bracket 10e. Thus when locking element 21f is shifted along the axis of shaft 21, the teeth 21g and 10f will intermesh and effectively prevent any rotation of shaft 21. A spring 21h is provided to resiliently maintain locking element 21f in its locked position. Spring 21h operates between a collar 21j secured to shaft 21 and the other face of bracket 10e.

From the foregoing description, it will be apparent that at any time the tractor operator desires to effect an adjustment of the pitch of the raking teeth relative to the ground being raked, he need only grasp the crank portion 21a of shaft 21, push such crank portion rearwardly a slight amount sufficient to disengage the teeth 21g of the locking element from the teeth 10f of the locking abutment bracket 10e, and then rotate shaft 21 until the desired adjustment of crank axles 16 and 17 has been accomplished. When the tractor operator releases the crank portion 21a, the locking element 21f will automatically re-engage the locking abutment 10e under the bias of spring 21h and the crank axles 16 and 17 are effectively rigidly retained in their adjusted positions. Obviously, the described construction permits adjustment of the pitch of the raking teeth of the side delivery rake to be accomplished in an extremely simple, economical and convenient manner.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a side delivery rake having a frame and a cylindroid type raking reel having tooth bar mounting discs at each end, the improvements of a pair of crank axles respectively journaling said mounting discs in said frame, each of said crank axles having angularly displaced end portions respectively journaled to said discs and said frame, and means for concurrently angularly shifting said crank axles relative to said frame to thereby angularly shift the parallel axes of said end plates of said reel with respect to said frame.

2. The combination defined in claim 1 wherein said last mentioned means includes a manually rotatable shaft operatively connected to both of said crank axles, said shaft being axially shiftable through a limited range, a locking element on said shaft, a fixed abutment device disposed axially adjacent said locking element and resilient means axially urging said locking element into engagement with said abutment device.

3. In a side delivery rake having a frame and a cylindroid type raking reel having rake tooth bar mounting discs at each end adapted for rotation about spaced, parallel axes, the improvements comprising a pair of crank axles having main bearing portions and disc bearing portions, said disc bearing portions being angularly offset relative to said mean bearing portions, means for respectively journaling the discs on the disc bearing portions of said crank axles, means for journaling said main bearing portions on the frame with their axes aligned with the longitudinal axis of the raking reel, and manually operable means for concurrently angularly shifting said crank axles whereby the tooth bar mounting discs are tilted in the direction of the longitudinal reel axis to vary the pitch of the teeth relative to the ground.

VERNON O. HAUSWIRTH.

References Cited in the file of this patent

UNITED STATES PATENTS

| Number | Name | Date |
|---|---|---|
| 2,040,692 | Hitchcock | May 12, 1936 |
| 2,165,381 | Hume et al. | July 11, 1939 |
| 2,492,881 | Oehler et al. | Dec. 27, 1949 |